(12) United States Patent
Reed et al.

(10) Patent No.: US 8,966,218 B2
(45) Date of Patent: Feb. 24, 2015

(54) ON-ACCESS PREDICTIVE DATA ALLOCATION AND REALLOCATION SYSTEM AND METHOD

(75) Inventors: David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/829,257

(22) Filed: Jul. 1, 2010

(65) Prior Publication Data
US 2012/0005449 A1 Jan. 5, 2012

(51) Int. Cl.
*G06F 12/00* (2006.01)
*G06F 3/06* (2006.01)

(52) U.S. Cl.
CPC ............ *G06F 3/0607* (2013.01); *G06F 3/0631* (2013.01); *G06F 3/067* (2013.01); *G06F 3/0665* (2013.01)
USPC ............................ 711/171; 711/170; 711/172

(58) Field of Classification Search
USPC .................................................. 711/170–172
See application file for complete search history.

(56) References Cited

U.S. PATENT DOCUMENTS

| | | | |
|---|---|---|---|
| 5,018,060 A | 5/1991 | Gelb et al. | |
| 5,506,986 A | 4/1996 | Healy | |
| 7,590,816 B2 * | 9/2009 | Shinohara et al. | 711/170 |
| 2004/0167903 A1 | 8/2004 | Margolus et al. | |
| 2008/0059704 A1 * | 3/2008 | Kavuri | 711/117 |

FOREIGN PATENT DOCUMENTS

| | | |
|---|---|---|
| EP | 0670543 A1 | 9/1995 |
| EP | EP 0670543 A1 | 9/1995 |

OTHER PUBLICATIONS

White, Fred, "Dynamic Dataset Expansion," Adager Corporation, Sun Valley, Idaho 83353, URL:http://www.adager.com/TechnicalPapersHTML/DDX-FW.html.
Rhodes, Ryan, "Simplifying Storage Management with EAVs," IBM Systems Magazine, Aug. 2008, URL:http://www.ibmsystemsmag.com/print/printaspx?print_page=%2Fmainframe%2Fjulyaugust08%2Ffocusonstorage%2F21043printp1.aspx&string_referer=fmainframe/julyaugust08/focusonstorage/21043p1.aspx.
"DB2 VSAM Cluster Management," URL: http://www.ruban.de/DB2_for_z_OS/DB2_for_z_OS___Tipps_Tricks/System-_und_betriebsorientiert/DB2_VSAM_Cluster_Management/db2_vsam_cluster_management.html.
(Continued)

*Primary Examiner* — Jasmine Song
(74) *Attorney, Agent, or Firm* — Nelson and Nelson; Daniel P. Nelson; Alexis V. Nelson

(57) ABSTRACT

A method for predictively allocating space in a database system includes detecting an access request for a data set, evaluating a growth rate of the data set to determine a predicted increase in size of the data set, and in response dynamically altering an attribute of an allocation for the data set. Attributes altered include the size of volumes and the number of volumes comprising the data set. The method may include setting a flag indicating an instruction to rewrite the data set if the evaluation indicates that rewriting is needed to accommodate the predicted increase in size. The method may include rewriting the data set from a lower address space of a volume to a higher address space of the volume if the size of the data set is equal to or greater than an allocation increment of the upper address space. A corresponding apparatus and computer program product are also disclosed herein.

19 Claims, 5 Drawing Sheets

(56) References Cited

OTHER PUBLICATIONS

White, Fred, "Dynamic Dataset Expansion," Adager Corporation, Sun Valley, Idaho 83353, URL:http://www.adager.com/TechnicalPapersHTML/DDX-FW.html, publication date no later than: Mar. 19, 2010.

Rhodes, Ryan, "Simplifying Storage Management with EAVs," IBM Systems Magazine, Aug. 2008, URL:http://www.ibmsystemsmag.com/print/printaspx?print_page=%2Fmainframe%2Fjulyaugust08%2Ffocusonstorage%2F21043printp1.aspx&string_referer=/mainframe/julyaugust08/focusonstorage/21043p1.aspx.

"DB2 VSAM Cluster Management," URL: http://www.ruban.de/DB2_for_z_OS/DB2_for_z_OS_Tipps_Tricks/System_und_betriebsorientiert/DB2_VSAM_Cluster_Management/db2_vsam_cluster_management.html, publication date no later than: Mar. 19, 2010.

* cited by examiner

ON-ACCESS PREDICTIVE DATA ALLOCATION AND REALLOCATION SYSTEM AND METHOD

BACKGROUND

1. Field of the Invention

This invention relates to apparatus and methods for storing data sets, and more particularly to apparatus and methods for allocating storage space for a data set in a database system.

2. Background of the Invention

The amount of data that needs to be managed by enterprises is growing at an extremely high rate. One challenge facing database management systems is allocating sufficient storage space to accommodate a data set that is constantly expanding in size. A customer of a database management service typically must review their data set compared to a current allocation to ensure that sufficient storage space and logical storage units are available for an addition to the data set.

One available database management solution is provided by z/OS provided by International Business Machines (IBM). In z/OS a data set may be stored in one or more volumes. In each volume z/OS makes an initial allocation known as a "primary extent." The primary extent may then be added upon by "secondary extents." The number of secondary extents permitted for a volume is 16 for some systems and 123 for systems employing a virtual storage access method (VSAM). The maximum number of volumes permitted for a data set is 59.

In prior systems, the allocation of storage space for a data set was evaluated as soon as an addition to the data set exceeded the current allocation. Accordingly, a user would need to evaluate the current allocation prior to attempting a task to ensure that the task would not fail for lack of space. If additional space was needed, completion of the task would be delayed while extents and/or volumes were added and/or reconfigured to accommodate the increase in size of the data set caused by the specific task.

In view of the foregoing, it would be an advancement in the art to provide a system and method for reducing the need for user intervention and delays resulting from database access tasks that exceed a data set's current allocation.

SUMMARY

The invention has been developed in response to the present state of the art and, in particular, in response to the problems and needs in the art that have not yet been fully solved by currently available apparatus and methods. Accordingly, the invention has been developed to provide apparatus and methods for optimizing allocation amounts for data sets. The features and advantages of the invention will become more fully apparent from the following description and appended claims, or may be learned by practice of the invention as set forth hereinafter.

Consistent with the foregoing, a method for predictively allocating storage space for a data set in a storage system is disclosed herein. In certain embodiments, such a method includes detecting a request to access a data set and determining a growth rate of the data set. A predicted increase of the data set size is calculated according to the growth rate. The method includes dynamically altering at least one attribute of an allocation of space storing the data set effective to render the allocation of space capable of storing the predicted increase of the data set size. Dynamically altering the at least one attribute of the allocation may occur while the data set is open and may include increasing the number of volumes allocated to the data set and increasing the size of volumes comprising the data set.

In some embodiments, the method includes detecting a closing of the data set and, in response, rewriting the data set to accommodate an increase in size of the data set. Rewriting the data set may include rewriting the data set having a smaller number of logical divisions. This may include rewriting the data set to have at least one of fewer volumes and fewer extents.

The method may also include detecting an increase in size of a data set to be equal to or greater than a first allocation increment, the first allocation increment being the minimum allocation increment for an upper address space of a volume comprising the data set. The method may further include rewriting the data set to the upper address space of the volume upon detecting the increase in size of the data set to be equal or greater than the first allocation increment.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
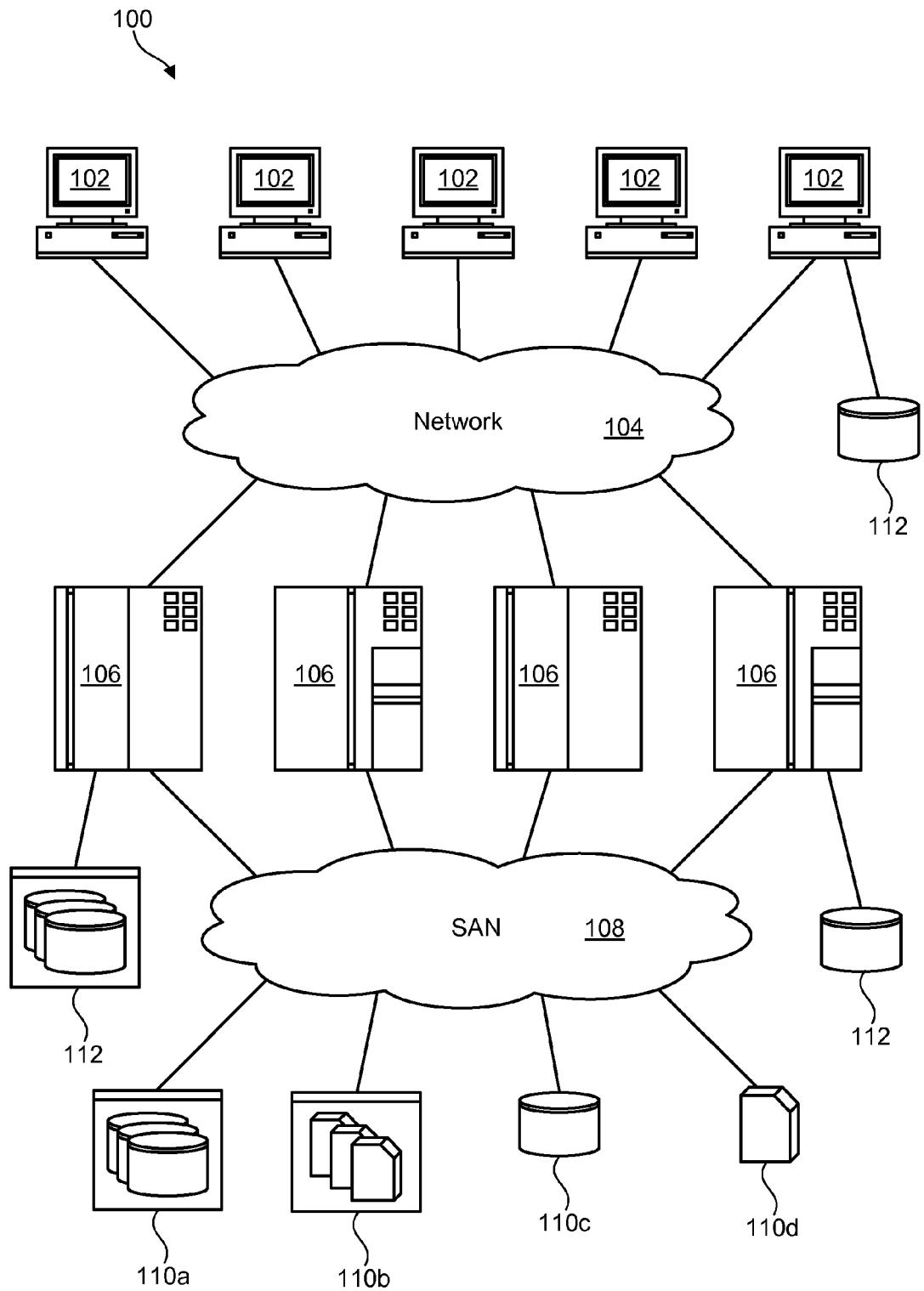
FIG. 1 is a high-level block diagram showing one example of a network environment in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., hard-disk drives, solid-state drives, tape drives, or arrays thereof). These computers 102, 106 and direct-attached storage systems 112 may communicate using protocols such as ATA, SATA, SCSI, SAS, Fibre Channel, or the like. One or more of the storage systems 112 may contain storage pools that may benefit from the predictive allocation techniques disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from the predictive allocation techniques disclosed herein.

Figure 2:
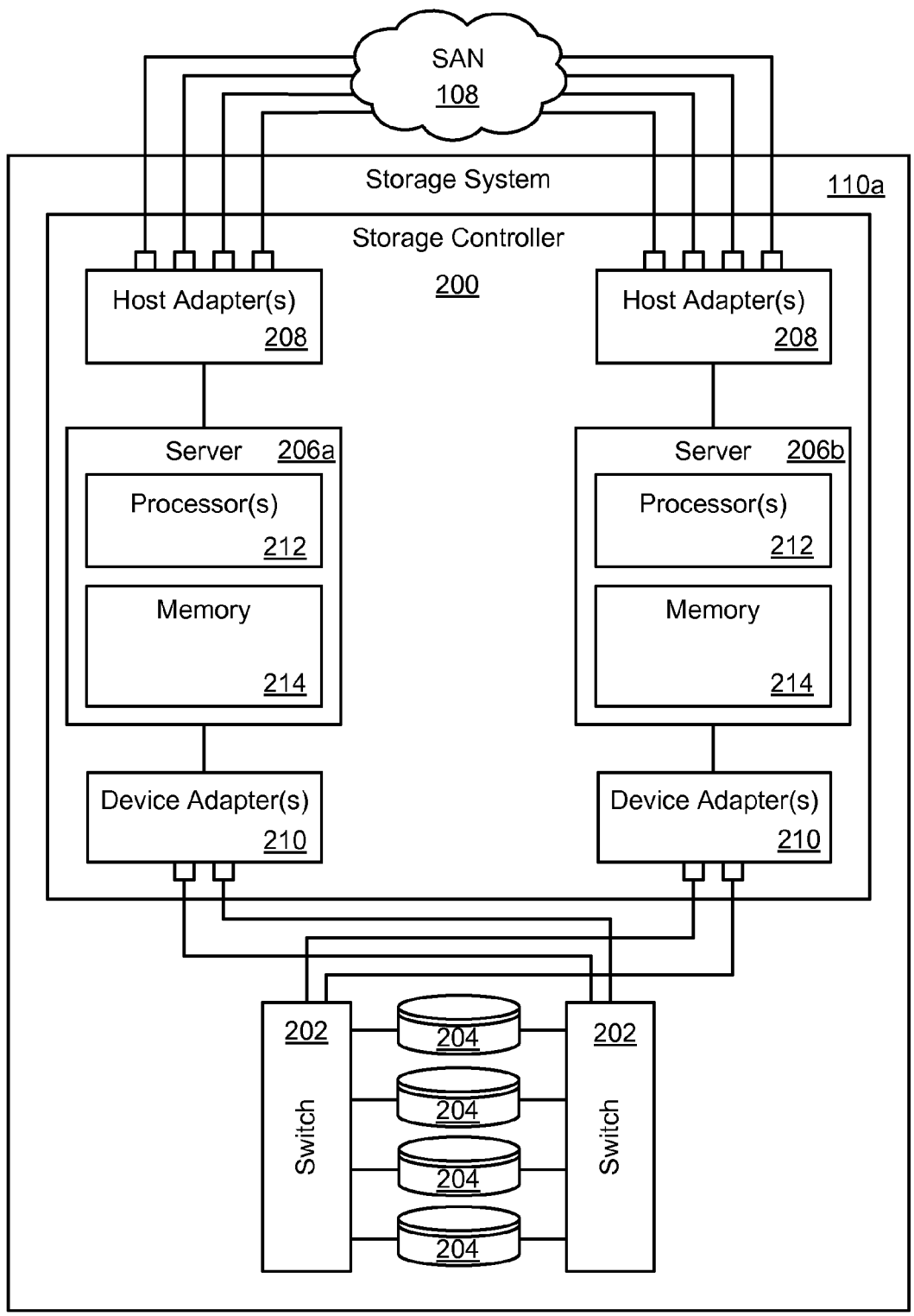
FIG. 2 is a high-level block diagram showing one example of a storage system suitable for use with embodiments of the present invention.

Referring to FIG. 2, one embodiment of a storage system 110a containing an array of storage devices 204 (e.g., hard-disk drives 204 and/or solid-state drives 204) is illustrated. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the predictive allocation techniques disclosed herein are not limited to the IBM DS8000™ enterprise storage system 110a, but may be implemented in any comparable or analogous storage system 110 regardless of the manufacturer, product name, or components or component names associated with the storage system 110. Any storage system 110 that could benefit from the predictive allocation techniques is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
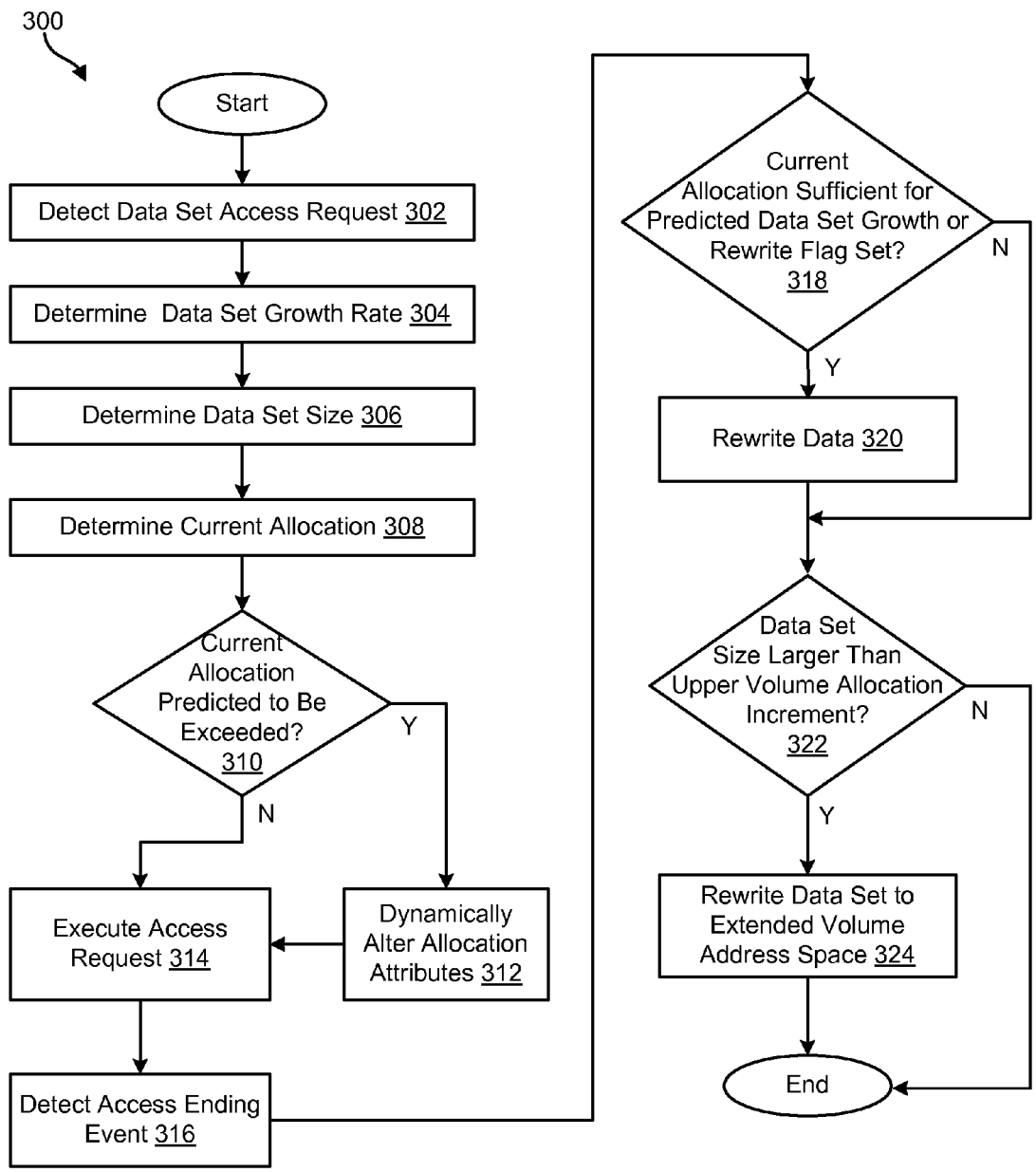
FIG. 3 is a process flow diagram of a method for predictively allocating storage space in a storage system in accordance with an embodiment of the present invention.

Referring to FIG. 3, one embodiment of a method 300 for predictive allocation of storage space in a storage system 110 is illustrated. As noted above, for data sets that are constantly growing, the amount of storage space allocated within logical volumes of a storage system 110 may be exceeded by database operations that add data to the data set. In the event that an operation writing to the data set exceeds the allocated space, the operation will fail.

The method 300 of FIG. 3 provides a method for predictively allocating storage space within the logical volumes of a data set in order to reduce the occurrence of write operation failure. The method 300 includes detecting 302 a data set access request. The data access request may comprise an instruction to open the data set for writing. Upon receiving the request, a growth rate for the data set is determined 304. Determining 304 the growth rate may include calculating the growth rate for the data set from records describing operations that increase the size of the data set. For example, in some storage systems 110, a log is maintained of some or all database activity. In the z/OS, the System Management Facility (SMF) generates records of activity taking place on the computer system it controls. In some embodiments, the SFM records dealing with interactions with a storage system 110 controlled by a computer system executing z/OS may be analyzed to determine the size and frequency of operations that increase the size of a data set. Of course, for storage systems 110 using other operating systems, similar logged descriptions of operations performed on a data set may be used to determine the growth rate of the data set.

The growth rate may be determined by statistical methods known in the art to characterize the behavior of a process or system. For example, an N degree polynomial curve fit of the growth rate may be generated that approximates growth of the data set with respect to time. The growth rate may then be determined to be the slope of the N degree polynomial at the time an access request is detected at step 302.

The growth rate may be expressed as a ratio of an increase in storage space and a time. For example, the growth rate may be expressed as the amount of time required for a data set to grow a predetermined amount. Alternatively, the growth rate may be expressed as the amount of data added to the data set during a predefined period of time. In some embodiments, the growth rate may be expressed as data set growth per write operation. In still other embodiments, multiple parameters may be calculated to characterize the growth rate of a data set. For example, terms corresponding both to growth per unit time and growth per write operation may be calculated based on statistical analysis of logged data recording past data set access operations.

In some embodiments, determining the growth at step 304 may include reading data characterizing the growth rate from a file where it was previously stored. For example, the growth rate may be calculated and stored only once every M access requests or once every M write operations and at all other times be read from its storage location at step 304.

At step 306, the current size of the data set is determined and at step 308 the current allocation for the data set is determined. At step 310 the current size of the data set, current allocation, and growth rate are evaluated to determine the likelihood that the access request detected at step 302 will cause the data set to exceed the current allocation. Where the growth rate is calculated as the increase in size of the data set per write operation, step 310 may include evaluating whether the growth rate is larger than the difference between the current allocation and the current data set size. Where the growth rate is calculated in terms of time, step 310 may include evaluating the growth rate with respect to a predefined time value to determine the likelihood that data written by a write operation will exceed the difference between the current data set size and the current allocation. For example, the growth rate may be multiplied by a time value to obtain an expected increase in size and the expected increase may then be evaluated with respect to the difference between the current allocation and the current data set size. Alternatively the difference between the current allocation and the current data set size may be divided by the growth rate to obtain a time, which is then compared to the predetermined time value to determine whether the current allocation is likely to be exceeded. The time value used may be a user specified buffer time value, the time since the last write operation, or some other preconfigured time value. Where a specific time interval is used to determine an expected increase in data set size, a curve fit of statistical data indicative of the growth rate with respect to time may be integrated over the time interval to determine the expected increase in the data set size over the time interval.

If at step 310 it is determined that the current allocation is likely to be exceeded, then the allocation for the data set may be dynamically altered at step 312. In one illustrative storage system 110, each volume of a data set is created with a first or "primary" allocation of storage space and a specified secondary allocation. The secondary allocation is an increment by which the primary allocation will be extended once the primary allocation and any previous extensions (referred to as "extents") have been filled. In such systems, the number of permissible extents is limited. One common value is 16. For some systems, such as those implementing the virtual storage access method (VSAM), the number of permissible extents is 123. If the maximum number of extents is reached, a volume may need to be rewritten, which may require the data set to be closed and introduce considerable delay. In storage systems 110 defining extent limits and a secondary allocation size, dynamically altering an attribute of the current allocation at step 312 may include increasing the value of the secondary allocation according to the growth rate to allow larger increases in storage capacity per extent. Increasing the size of the secondary allocation in response to the growth rate is advantageous inasmuch as it reduces the likelihood that the maximum number of extents will be reached when the growth rate indicates that many extensions would be needed at the original secondary allocation amount.

As noted above, a data set may be stored in one or more volumes having an allocated size. In some instances, dynamically altering allocation attributes at step 312 includes increasing the number of volumes of a data set. Increasing the number of volumes increases the total amount of data that may be stored in the data set inasmuch as volumes have both a total storage limit and an extent limit as noted above. Accordingly, a data set stored in a volume that has reached the maximum number of extents may advantageously have a volume added thereto.

Dynamically altering allocation attributes at step 312 may include dynamically increasing the size of one or more volumes of the data set. Dynamically increasing the size of one or more volumes of the data set may refer to altering the size of one or more logical volumes of the data set while it is open for writing. Dynamically increasing the size of the one or more volumes may be performed according to functionality provided by the IBM DS8000™ enterprise storage system. Of course, other storage systems that natively support, or may be modified to support, dynamically increasing the size of logical volumes may be suitable for performing the dynamically altering step 312. Dynamically increasing the size of one or more current volumes of a data set may be advantageous for data sets that cannot span multiple volumes such as catalogs, which are a data set type used for storing system data, such as data that is used to restore a system that crashes.

Dynamically altering allocation attributes at step 312 may include setting a flag indicating that when the data set is closed it is to be rewritten to consolidate the number of extents and/or volumes. This flag may be set where one or both of the volume number limit and extent limit have been reached or are predicted to be reached. Where the extent limit has been reached or is expected to be reached, the flag may be set indicating that on close of the data set a volume having no remaining extents or that is predicted to have insufficient extents based on the growth rate is to be rewritten to have a reduced number of extents. In a like manner, for a data set having the maximum number of volumes or predicted to have insufficient volumes based on the growth rate, the flag may be set to indicate that the data set is to be rewritten to a smaller number of larger volumes.

In some embodiments, volumes may include a lower address space and an upper address space. The upper address space is allocated in increments having a first size and the lower address space is allocated in increments having a second size that is substantially lower than the first size. For example, z/OS includes Extended Address Volumes (EAV) wherein a lower address spaced is defined below a threshold (currently 65,520 cylinders) and an upper address space is defined above the threshold. Space may be allocated in the lower address space in units of tracks (a sub-unit of a cylinder) and cylinders. Allocations in the upper address space are allocated in an allocation increment equal to multiple cylinders (currently 21). Accordingly, in some embodiments of the present invention, a data set residing in the lower address space that equals or exceeds the allocation increment may be flagged to be rewritten on close of the data set to the upper address space. For small data sets, operating in the lower address space is advantageous inasmuch as allocations can be made in small increments. Transferring data sets exceeding the allocation increment to the upper address space frees up the lower address space and enables more new allocations to be made in smaller increments.

At step 314 the access request detected at step 302 is executed. In some embodiments, the access request is executed only after the dynamic allocation step 312. In other embodiments, the access request is executed independent of any of the preceding steps of the method 300. For example, the method 300 may be executed in parallel with execution of the access request.

At step 316, an access ending event is detected. The access ending event may include a successful or unsuccessful completion of the access request detected at step 302. Upon detecting the access ending event, the method 300 includes evaluating at step 318 whether the current allocation is sufficient for predicted data set growth or whether a rewrite flag has been set. Step 318 may include evaluating one or more of the current allocation as modified at step 312, the data set size following execution of the access request at step 314, and the growth rate either updated or not in view of execution of the access request.

As noted with respect to the evaluation step 310, the evaluation of the growth rate may include predicting the likelihood that the data set will exceed the current allocation at a specified time, such as a specific time period after the current time or after the next one or more write operations. Where the growth rate is calculated as the increase in size of the data set per write operation, step 318 may include evaluating whether the growth rate is larger than the difference between the current allocation and the current data set size. Where the growth rate is calculated in terms of time, step 318 may include evaluating the growth rate with respect to a predefined time value to determine the likelihood that data written by the next one or more write operations will exceed the difference between the current data set size and the current allocation. For example, the growth rate may be multiplied by a time value to obtain an expected increase in size and evaluating the expected increase with respect to the difference between the current allocation and the current data set size. Alternatively the difference between the current allocation and the current data set size may be divided by the growth rate to obtain a time, which is then compared to the predetermined time value to determine whether the current allocation is likely to be exceeded. The time value used may be a user specified buffer time value, the time since the last write operation, or some other preconfigured time value. Where a time interval is used to determine an expected increase in data set size, a curve fit of statistical data indicative of the growth rate with respect to time may be integrated over the time interval to determine the expected increase in the data set size over the time interval.

If a flag has been set to rewrite the data set or the data set is predicted to exceed the current allocation within a specified time or number of write operations, step 320 may be performed to rewrite the data to accommodate future data set growth. Step 320 may include any of the steps taken at step 312 including increasing the number of volumes allocated to a data set or increasing the size of the volumes of the data sets. If a volume of the data set has reached the extent limit, or is predicted to reach the extent limit within the specified time or number of write operations, step 320 may include rewriting the volume such that it includes fewer than the maximum allowable number of extents. In a like manner, if a data set has the maximum number of volumes, or is predicted to reach the maximum number of volumes within the specified time interval or number of write operations, the data set may be rewritten to fewer volumes.

If a flag has been set indicating that a volume is to be consolidated into a single extent, this action may be performed at step 320. Likewise, if a flag has been set indicating that multiple volumes are to be consolidated into a reduced number of volumes, this action may be performed at step 320.

At step 322, the method 300 evaluates whether the data set is larger than the allocation increment of the upper address space of the volume in which it resides and is located within the lower address space. In some embodiments, step 322 may include evaluating whether a flag was set at the dynamic altering step 312 indicating that the data set was greater than or equal to the upper address space allocation increment, as discussed hereinabove.

In an alternative embodiment, evaluation of the size of the data set relative to the allocation increment of the upper address space prior to the access ending event at step 316 may be omitted and no flag may be set to indicate the outcome of the evaluation. In such embodiments, the size of the data set relative to the allocation increment of the upper address space may be evaluated at step 322. If it is determined that the data set is greater than or equal to the upper address space allocation increment, then at step 324, the data set is rewritten to the upper address space.

In some embodiments, steps 316 through 324 may be executed without first executing steps 302 through 312. In a like manner, steps 302 through 312 may be executed without subsequently executing steps 316 through 324.

Figure 4:
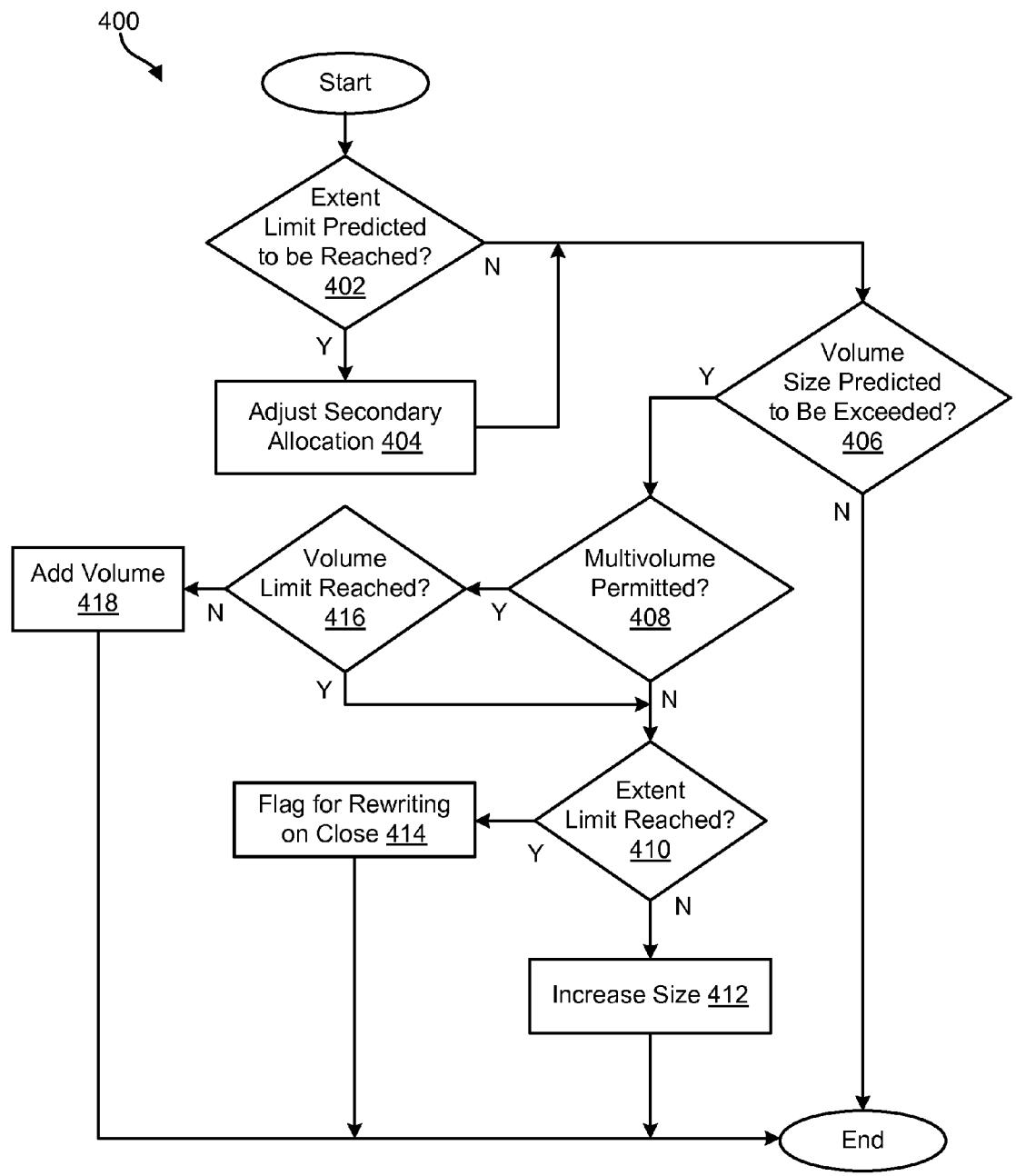
FIG. 4 is a process flow diagram of a method for dynamically altering attributes of an allocation for a data set in accordance with an embodiment of the present invention.

Referring to FIG. 4, dynamically altering an allocation attribute at step 312 of the method 300 may include executing a method 400. The method 400 includes evaluating whether one or more volumes of the data set are predicted to exceed the extent limit at step 402. If so, then the secondary allocation of such volumes is increased at step 404. The growth rate may be used to determine whether the extent limit is expected to be exceeded. The growth rate may be analyzed with respect to the secondary allocation at step 404 to determine a value for the secondary allocation that will increase the likelihood that the extent limit will not be reached prior to filling the volume without increasing the size of the secondary allocation such that the volume will not become unduly fragmented.

At step 406, the method 400 includes evaluating whether the volume size is predicted to be exceeded based on analysis of the growth rate with respect to the current allocation and data set size as discussed hereinabove. If not, then no further action may be taken and the method 400 will end. If so, then step 408 is executed to determine whether the data set may be written over multiple volumes. As noted above, certain data sets must be contained within a single volume. If not, step 410 is executed to determine whether the data set can be extended to make use of increased size of the volume, i.e. has the extent limit been reached. If the extent limit has not been reached, then at step 412 the volume size is increased. If the extent limit has been reached, then a flag is set at step 414 indicating that the data set should be rewritten to a fewer number of extents after the data set is closed and the method 400 ends.

If multivolume data sets are determined to be permitted at step 408, then step 416 may be executed to determine whether the volume number limit for the data set has been reached. As noted above, the volume limit is typically 59, though different systems suitable for use with the invention may have different values. If the volume limit has been reached, the method 400 proceeds to step 410 and continues as described above with respect to steps 410-414. If the volume number has not been reached, then a volume is added at step 418 to the data set and the method 400 ends.

Figure 5:
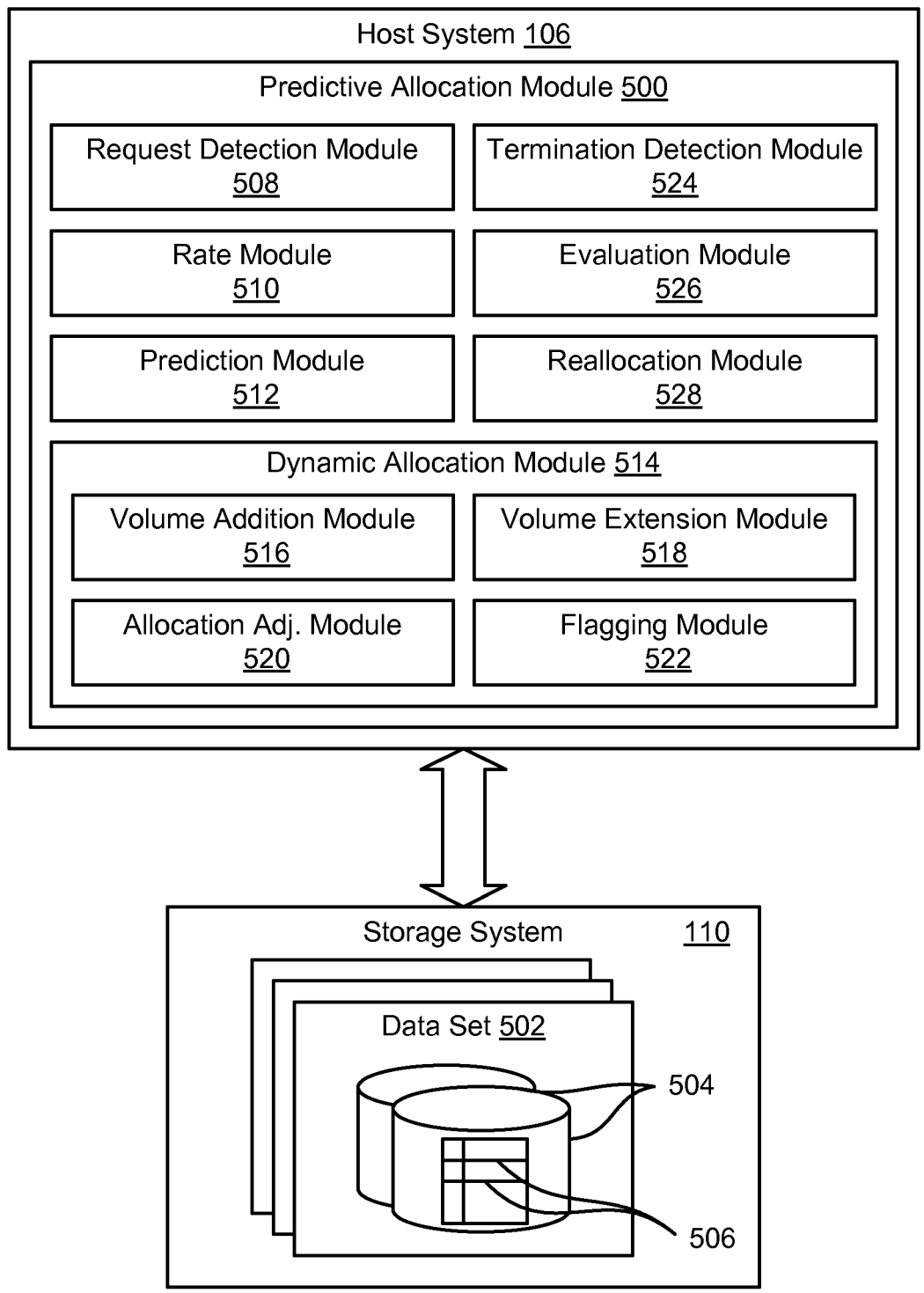
FIG. 5 is a high-level block diagram showing modules that may be used to implement the methods illustrated in FIGS. 3 and 4.

Referring to FIG. 5, the methods 300 and 400 described in FIGS. 3 and 4 may be implemented in the form of one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in a host system 106 may actually be implemented in a storage system 110 and vice versa. Other functionality shown only in the host system 106 may actually be distributed across the host system 106 and the storage system 110. Thus, the location of the modules is presented only by way of example and is not intended to be limiting.

As shown in FIG. 5, in selected embodiments, a host system 106 may include a predictive allocation module 500. The predictive allocation module 500 may facilitate management of a storage system 110 hosting a data set 502 comprising one or more volumes 504 each having one or more extents 506.

The predictive allocation module 500 may include a request detection module 508, rate module 510, prediction module 512, and dynamic allocation module 514. The request detection module 508 detects a data set access request. For example, the data set access request may comprise an instruction to open the data set 502 for reading or writing.

The rate module 510 determines a growth rate for the data set 502. Determining the growth rate may include calculating the growth rate for the data set 502 from records describing operations that increase the size of the data set 502. The growth rate may be determined by statistic methods known in the art to characterize the behavior of a process or system. For example, an N degree polynomial curve fit of the growth rate may be generated that approximates growth of the data set 502 with respect to time. The growth rate may then be determined to be the slope of the N degree polynomial at the time an access request is detected at step 308 or the integral of the curve fit over a specified time interval. The rate module 510 may read the growth rate from a file where it was previously stored. For example, the growth rate may be calculated and stored only once every M access requests or once every M write operations and at all other times be read from its storage location by the rate module 510.

The prediction module 512 evaluates the growth rate, current allocation, and current data set 502 size to determine the likelihood that the access request will increase the data set 502 size above the current allocation or the likelihood that the data set size will exceed the current allocation within a specified time interval or number of write operations. If the prediction module 512 determines that the current allocation is likely to be exceeded, it may invoke the dynamic allocation module 514.

The dynamic allocation module 514 includes one or more of a volume addition module 516, volume extension module 518, allocation adjustment module 520, and flagging module 522. The volume addition module 516 may add additional volumes 504 to a data set if the data set 502 can be extended to multiple volumes 504 and if the data set 502 has fewer than a maximum number of volumes 504. If a data set 502 is not permitted to extend over multiple volumes 504 or the maximum number of volumes 504 has been reached, then the volume extension module 518 may be invoked. The volume extension module 518 dynamically increases the size of one or more volumes 504 of the data set 502 to accommodate a predicted increase in size of the data set 502. The volume extension module 518 may evaluate whether the number of extents 506 of one or more of the volumes 504 is equal to a maximum permissible number of extents such that the volume 504 will be able to take advantage of the increase in volume size. If not, then the volume extension module 518 may invoke the flagging module 522 to set a flag indicating that the number of extents 506 of one or more volumes 504 of the data set 502 should be reduced by rewriting the data set 502 once the data 502 set is closed.

The flagging module 522 may further be configured to determine whether the size of the data set 502 is larger than an allocation increment of an upper address space of a volume 504 storing the data set and whether the data set 502 is stored in the lower address space of the volume 504. If this is the case, the flagging module 522 may set a flag indicating that the data set 502 should be rewritten to the upper address space of the volume 504 when the data set 502 is closed.

The predictive allocation module 500 may further include a termination detection module 524, evaluation module 526, and a reallocation module 528. The detection module 524 invokes the evaluation module 526 upon detecting closing of the data set 502. The evaluation module 526 evaluates whether the current allocation is sufficient for predicated data set growth or whether a rewrite flag has been set by the flagging module. Evaluating whether the current allocation is sufficient for predicted data set growth may include evaluating a growth rate as described hereinabove. The evaluation module 526 may also evaluate whether the data set 502 has a size equal to or greater than an upper address space allocation increment of at least one of the volumes 504.

If a flag has been set to rewrite the data set or the data set is predicted to exceed the current allocation within a specified time or number of write operations, then the evaluation module 526 may invoke the reallocation module 528. The reallocation module 528 performs consolidation of volumes and extents as instructed by flags set by the flagging module 522 or as determined to be necessary to accommodate predicted increases in growth by the evaluation module 526. The reallocation module 528 may also increase volume sizes or add volumes 504 to a data set 502 to accommodate predicted increases in data set size.

The reallocation module 528 may also rewrite a data set 502 from the lower address space of a volume 504 to the upper address space thereof in response to a flag instructing such action to be taken as set by the flagging module 522. Alternatively, where the size of the data set relative to the upper address space allocation increment is evaluated after detection of an access ending event by the termination module 524, the reallocation module 528 may rewrite the data set 502 from the lower address space of the volume 504 to the upper address space thereof in response to a determination by the evaluation module 526 that the data set 502 has a size equal to or exceeding the upper address space allocation increment.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for predictive allocation of space in a database system, the method comprising:
   detecting a request to access a data set, the data set having associated therewith a secondary allocation amount specifying an increment in which the data set will expand when additional space is needed;
   determining a growth rate of the data set according to past accesses of the data set;
   calculating a predicted increase of the data set size for the request according to the growth rate;
   dynamically altering at least one attribute of an allocation of space storing the data set effective to render the allocation of space capable of storing the predicted increase of the data set size, wherein dynamically altering the at least one attribute comprises automatically increasing the secondary allocation amount associated with the data set; and
   in the event a maximum number of logical divisions storing the data set has been reached or is predicted to be reached, setting a flag indicating that the data set is to be rewritten to a decreased number of logical divisions.

2. The method of claim 1, wherein dynamically altering at least one attribute of the allocation of space storing the data set occurs while the data set is open.

3. The method of claim 1, wherein automatically increasing the secondary allocation, amount comprises automatically increasing the secondary allocation amount in accordance with the growth rate.

4. The method of claim 1, wherein the data set defines at least one volume defining a logical division of an allocation of space; and
   wherein dynamically altering at least one attribute of the allocation of space storing the data set comprises increasing at least one of the number of volumes and the size of the at least one volume.

5. The method of claim 1, wherein:
   the logical divisions comprise volumes of data and one or more extents stored within each volume; and
   the database system includes limits on the number of volumes and extents per volume addressable by a data set.

6. The method of claim 5, further comprising:
   detecting an access ending event for the data set; and
   rewriting the data set to a different allocation according to an evaluation of the flag.

7. The method of claim 6, wherein rewriting the data set comprises rewriting the data set having a fewer number of logical divisions.

8. The method of claim 1, further comprising:
   detecting an increase in size of the data set to be equal to or greater than a first allocation increment, the database system configured to store a data set in a logical volume having a lower address space and an upper address space, wherein database system is configured to allocate storage space within the upper address space in increments having the first allocation increment and to allocate storage space within the lower address space in increments having a second allocation increment, the second allocation increment being substantially smaller than the first allocation increment;

in response to detecting the increase in size of the data set to be equal to or greater than the first allocation increment, rewriting the data set to the upper address space.

9. An apparatus for predictive allocation of space in a database system, the method comprising:
   a detection module to detect a request to access a data set, the data set having associated therewith a secondary allocation amount specifying an increment in which the data set will expand when additional space is needed;
   a rate module to determine a growth rate of the data set according to past accesses of the data set;
   a prediction module to calculate an expected increase of the data set size according to the growth rate;
   a dynamic allocation module to alter at least one attribute of an allocation of space storing the data set effective to render the allocation of space capable of storing the expected increase of the data set size, wherein dynamically altering the at least one attribute comprises automatically increasing the secondary allocation amount associated with the data set; and
   a flagging module to, in the event a maximum number of logical divisions storing the data set has been reached or is predicted to be reached, set a flag indicating that the data set is to be written to a decreased number of logical divisions.

10. The apparatus of claim 9, wherein the dynamic allocation module is further configured to alter the at least one attribute of the allocation of space storing the data set while the data set is open.

11. The apparatus of claim 9, wherein automatically increasing the secondary allocation amount comprises automatically increasing the secondary allocation amount in accordance with the growth rate.

12. The apparatus of claim 9, wherein the data set defines at least one volume defining a logical division of an allocation of space; and
   wherein the dynamic allocation module is further configured to alter at least one attribute of the allocation of space storing the data set by increasing at least one of the number of volumes and the size of the at least one volume.

13. The apparatus of claim 9, further comprising:
   an evaluation module configured to detect an increase in size of the data set to be equal to or greater than a first allocation increment, the database system configured to store a data set in a logical volume having a lower address space and an upper address space, wherein database system is configured to allocate storage space within the upper address space in increments having the first allocation increment and to allocate storage space within the lower address space in increments having a second allocation increment, the second allocation increment being substantially smaller than the first allocation increment; and
   a reallocation module configured rewrite the data set to the upper address space in response to detection of the increase in size of the data set to be equal to or greater than the first allocation increment.

14. A computer program product to predictively allocate space in a database system, the computer program product comprising a computer-readable storage medium having computer-usable program code embodied therein, the computer-usable program code comprising:
   computer-usable program code to detect a request to access a data set, the data set having associated therewith a secondary allocation amount specifying an increment in which the data set will expand when additional space is needed;
   computer-usable program code to determine a growth rate of the data set according to past accesses of the data set;
   computer-usable program code to calculate a predicted increase of the data set size for the request according to the growth rate;
   computer-usable program code to dynamically alter at least one attribute of an allocation of space storing the data set effective to render the allocation of space capable of storing the predicted increase of the data set size, wherein dynamically altering the at least one attribute comprises automatically increasing the secondary allocation amount associated with the data set; and
   computer-usable program code to, in the event a maximum number of logical divisions storing the data set has been reached or is predicted to be reached, setting a flag indicating that the data set is to be rewritten to a decreased number of logical divisions.

15. The computer program product of claim 14, further comprising compute-usable program code to dynamically alter at least one attribute of the allocation of space storing the data set while the data set is open.

16. The computer program product of claim 14, wherein automatically increasing the secondary allocation amount comprises automatically increasing the secondary allocation amount in accordance with the growth rate.

17. The computer program product of claim 14, wherein the data set defines at least one volume defining a logical division of an allocation of space; and wherein the computer usable program code to dynamically alter at least one attribute of the allocation of space storing the data set is further configured to increase at least one of a number of volumes and the size of at least one volume.

18. The computer program product of claim 14, wherein:
   the logical divisions comprise volumes of data and one or more extents stored within each volume; and
   the database system includes limits on the number of volumes and extents per volume addressable by a data set.

19. The computer program product of claim 14, further comprising compute-usable program code to rewrite the data set to an upper address space of a volume storing the data set if the data set has a size equal to or greater than a first allocation increment, the database system configured to store a data set in a logical volume having a lower address space and an upper address space, wherein database system is configured to allocate storage space within the upper address space in increments having the first allocation increment and to allocate storage space within the lower address space in increments having a second allocation increment, the second allocation increment being substantially smaller than the first allocation increment.

* * * * *